United States Patent
Shahzad et al.

(10) Patent No.: US 6,469,834 B1
(45) Date of Patent: Oct. 22, 2002

(54) SYSTEM AND METHOD FOR ELIMINATION OF SCATTERED SIDE LOBES CREATED BY INTEGRATOR LENSLET ARRAYS

(75) Inventors: Khalid Shahzad, Ossining, NY (US); Jeffrey A. Shimizu, Cortlandt Manor, NY (US); John Domm, Ossining, NY (US)

(73) Assignee: Koninklijke Philips Electronics N.V. (NL)

(*) Notice: Subject to any disclaimer, the term of this patent is extended or adjusted under 35 U.S.C. 154(b) by 10 days.

(21) Appl. No.: 09/713,847

(22) Filed: Nov. 16, 2000

(51) Int. Cl.$^7$ .................. G03B 27/10; G03B 27/54
(52) U.S. Cl. ........................ 359/622; 355/67
(58) Field of Search .................. 359/622, 621, 359/623, 624, 626; 362/268; 353/122; 355/67; 349/57

(56) References Cited

U.S. PATENT DOCUMENTS

| | | |
|---|---|---|
| 3,503,667 A | 3/1970 | Schmidt |
| 4,619,508 A * | 10/1986 | Shibuya et al. ............ 353/122 |
| 5,268,775 A | 12/1993 | Zeidler |
| 5,504,598 A * | 4/1996 | Sprague et al. ............ 349/57 |
| 5,621,486 A | 4/1997 | Doany |
| 5,748,375 A * | 5/1998 | Yamana ............ 359/622 |
| 5,786,873 A | 7/1998 | Chiu et al. |
| 5,790,239 A * | 8/1998 | Komatsuda et al. ......... 355/67 |
| 5,831,712 A | 11/1998 | Tabata et al. |
| 5,959,773 A | 9/1999 | Gagnon |
| 6,088,067 A | 7/2000 | Willett |
| 6,141,300 A | 10/2000 | Getreuer |

FOREIGN PATENT DOCUMENTS

| | | | |
|---|---|---|---|
| EP | 0991281 A2 | 5/2000 | |
| JP | 11015074 AA | 1/1999 | |
| JP | 11024599 A | 1/1999 | |
| JP | 11-160791 * | 6/1999 | ........... G03B/21/14 |
| JP | 11352478 A | 12/1999 | |
| JP | 2000075246 A | 3/2000 | |
| JP | 2000098322 A | 4/2000 | |

* cited by examiner

Primary Examiner—Georgia Epps
Assistant Examiner—Gary O'Neill
(74) Attorney, Agent, or Firm—Dicran Halajian

(57) ABSTRACT

An optical illumination apparatus includes an illumination source, a pair of spaced integrator plates each having a plurality of lenslets, a conduit array, having a respective aperture corresponding to a plurality of the lenslets disposed there between, with non-reflective optically absorptive walls, and a relay optical structure for integrating light emitted from said second array of lenslets on a focal plane. The apparatus is employed by illuminating a first integrator plate having lenslets, subject to spatial intensity variations, segregating light from each respective lenslet with an elongated baffle, having a respective aperture for each of a plurality of respective lenslets, capturing light from each aperture with a second integrator plate having lenslets, and relaying the light to a focal plane, whereby light rays impinging on the walls of the elongated baffle are not transmitted through the aperture, thus substantially attenuating light rays having acute angles, to uniformly illuminate the focal plane.

19 Claims, 4 Drawing Sheets

SYSTEM AND METHOD FOR ELIMINATION OF SCATTERED SIDE LOBES CREATED BY INTEGRATOR LENSLET ARRAYS

FIELD OF THE INVENTION

The present invention relates to the field of uniform illumination systems, and more particularly to systems and methods for providing uniform illumination using integrator lenslet arrays, for example in image projection devices.

BACKGROUND OF THE INVENTION

It is well known to employ integrator lenslet arrays to provide a high intensity, uniform illumination, for example for image projection systems. In general, a high intensity lamp is provided, typically with a paraboloid reflector, directing illumination generally along a single axis. This light varies in spatial intensity depending on position with respect to the lamp, so a pair of spaced integrator plates, each composed of a corresponding array of lenslets, is provided. The light passing through each respective set of lenslets is then directed toward the image plane, through an optical relay lens system. Thus, the integrator plates serve to image the lamp from various vantage points, which are then summed, resulting in a uniform illumination.

One problem arising from this construction is that a proportion of the light exiting from the lamp, including both direct and reflected rays, is not collimated, and is thus directed at stray angles. This, in turn, causes so-called side lobes, in which light entering one lenslet of the first integrator plate is refracted toward a non-corresponding lenslet of the second integrator plate. This, in turn, results in rays which either do not strike the imaging plane or are directed at steep angles. In either case, this stray light can adversely affect the performance of the system. In particular, stray light created by these side lobes can scatter from various objects in the optical path, compromising the contrast of the system. These lenslet arrays are becoming very popular method of producing a uniform image from the lamp and, as their size decreases, the intensity of the side lobes also increases.

Thus, there is a need for an light integrator system which provides uniform and efficient illumination while eliminating sidelobe illumination.

JP 11-1160791 A relates to an illumination optical device for a projection display device. The system includes a lamp with a concave reflector, a pair of integrator lenslet arrays spaced by a light guide, and a relays lens system. In this system, light guides are provided to guide light from the lenslet of the first lens array plate to the lenslet of the second lens array plate for reduced light loss and increased efficiency. Thus, off axis rays are apparently guided to the second lenslet array, rather than absorbed.

EP 0 773 456 A2 provides a magnifying lens and display apparatus in which lens pairs may be held in relative position by a tubular structure. The axes of the sets of lens pairs are generally convergent, and the tubular structure formed of a black pigmented resin. The structure is thus employed as a compound magnifying lens for human visualization.

SUMMARY OF THE INVENTION

The present invention provides, according to one embodiment, a set of baffles, for example conduits or sheets, with light absorptive walls between respective lenslets or arrays of lenslets of the integrator plates, to interrupt propagation of the sidelobe rays.

These sidelobe-suppressed light integrator subsystems are especially useful in image projection systems, wherein stray light reduces contrast and may result in artifacts and poor image quality. The light integrator subsystem is, for example, inserted between the lamp and imaging panel.

It is noted that, while a portion of the light is lost in the conduit or baffle array, this light is considered parasitic on creation, and therefore its loss is not considered to substantially decrease efficiency of the system. Thus, by eliminating or decreasing these parasitic rays, performance is improved by ensuring high image contrast and fewer artifacts.

The conduit or baffle array is preferably non-reflective, since conserving these rays by reflection does not correct their propagation axis, and thus these rays would still exit from the integrator system at an undesired angle creating unwanted scatter light.

According to a preferred embodiment, the imaging device is rectangular, and therefore the integrator optics are designed to produce a uniform rectangular illumination at the focal plane thereof. In such a system, wherein the lenslets are disposed in a rectangular array with unequal horizontal and vertical spacing, the quantitative effect of sidelobe rays is anisotrophic such that the intensity of the side lobes being much stronger in smaller dimension of the lenslets. Thus, as shown in FIG. 3, the Y-axis lobes have greater intensity than the X-axis lobes. Thus, the problem may be addressed asymmetrically. Thus, for example, a set of parallel sheets may be provided between successive rows of lenslets along the Y-axis. While this does not substantially alter the X-axis sidelobe intensity, the Y-axis sidelobes will be substantially attenuated. By providing sheets instead of conduits or tubes, heat dissipation is enhanced, construction simplified, and light loss reduced, with some residual stray light.

In the case of conduits or tubes, sidelobes along both axes are suppressed. The array is preferably composed of rectangular tubular structures. In order to provide spatial efficiency, the walls of adjacent integrator structures are preferably common. The walls are preferably coated with a non-reflective black coating, to absorb light incident thereon. Between the lenslet array and conduit array, an air space may be provided for passive or forced convection. The external portion of the conduit array may be provided with a surface area for convective or radiant cooling. The conduit is preferably formed of a heat-tolerant thermally conductive material, such as copper or aluminum, although other materials may be suitable.

Therefore, it is an object of the invention to provide a lenslet integrator system having a pair of spaced integrator lenslet arrays, characterized in that a conduit is disposed between respective lenslet elements of the integrator to absorb stray light.

It is also an object of the invention to provide a conduit array for a lenslet integrator system, having a set of rectangular apertures corresponding to the lenslet array configuration and a non-reflective surface.

It is a further object of the invention to provide an optical illumination apparatus, comprising an illumination source; a first array of lenslets disposed along an illumination path of said illumination source; a conduit array, having a respective aperture corresponding to a plurality of said lenslets of said first array of lenslets, said conduit array having non-reflective optically absorptive walls; a second array of lenslets, aligned with said conduit array such that rays, passing through a respective one of said first array of lenslets and not intercepting said non-reflective optically absorptive walls, intersect a respective one of said second array of lenslets; and a relay optical structure for integrating light emitted from said second array of lenslets on a focal plane.

These and other object will be apparent from a review of the drawings and detailed description of the preferred embodiment.

DETAILED DESCRIPTION OF THE PREFERRED EMBODIMENT

EXAMPLE 1

Figure 1:
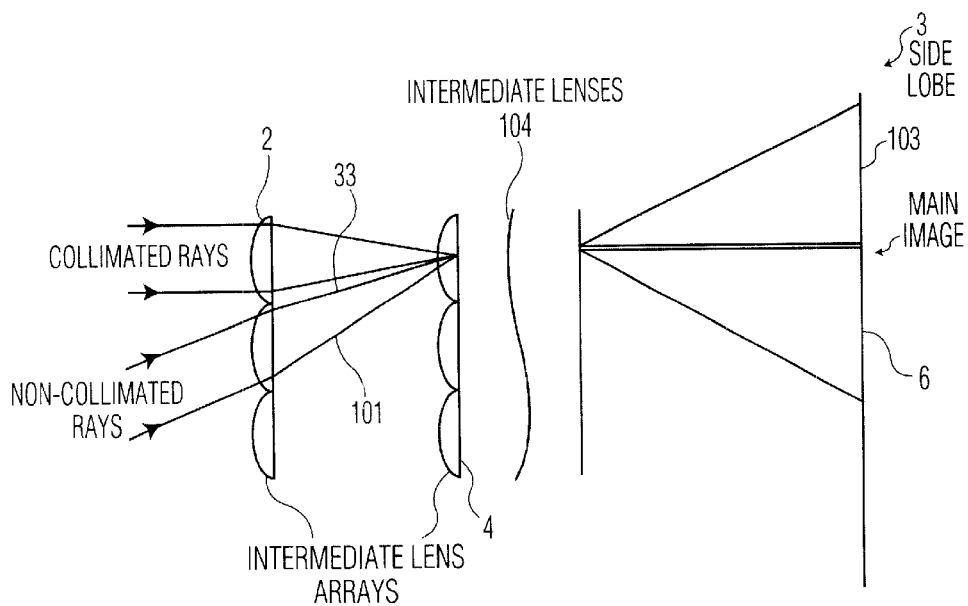
FIG. 1 shows a prior art integrator having a pair of respective lenslet arrays.
Figure 2:
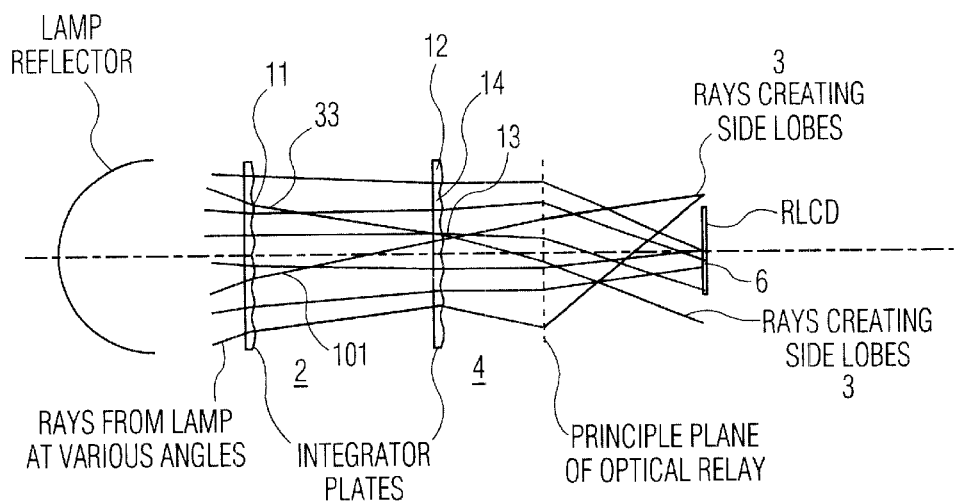
FIG. 2 shows a light path raytracing through the integrator of FIG. 1, showing the sidelobe path.
Figure 3:
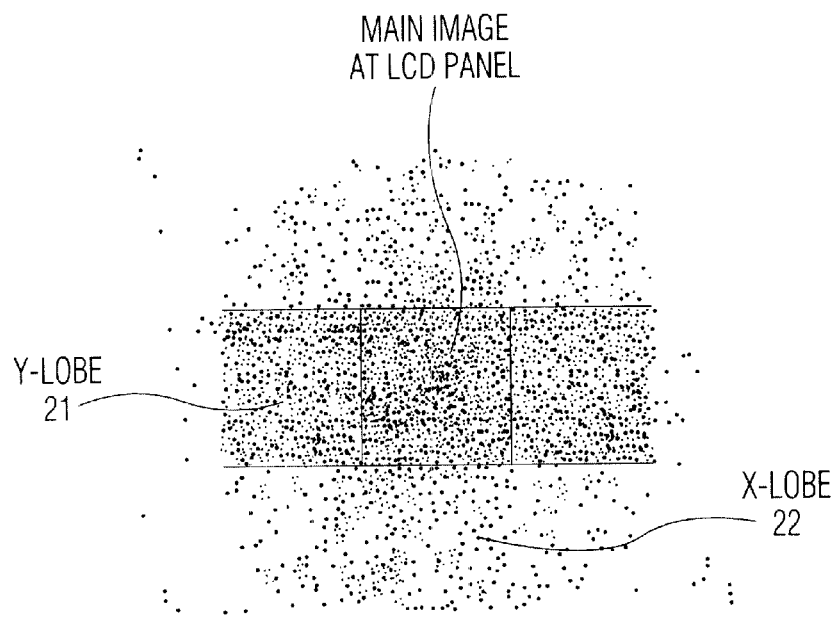
FIG. 3 shows a model of sidelobe ray distribution for a rectangular integrator array according to the prior art.

A shown in FIGS. 1–3, a portion of the light emitted from the projector lamp 1 is relatively off-axis with respect to the integrator lenslet array 2, resulting in sidelobe 3 generation. These sidelobes 3 involve light rays 33, 101 transmitted between non-corresponding lenslets of the pair 2, 4 of arrays, and are scattered from various scattering surfaces in the optical path and make their way to the screen causing degradation in the contrast ratio of the system. Further, a portion are incident on the imaging device 6 at steep angles, resulting in generation of artifacts.

FIGS. 1–2 show schematic diagrams of the origin of the side lobes 3. Non-collimated rays 33, 101 travel from one lenslet 11 to those lenslets 12, 13 of the second integrator plate 4 which are not directly aligned with it. The intensity of these sidelobes 3 is a very strong function of size of the lenslets 11, 12, 13, 14 (see FIG. 2). As the size of these lenslets 11, 12, 13, 14 becomes smaller, these sidelobes 3 increase in intensity and, therefore, the scatter light in the optical system also increases.

FIG. 3 shows sidelobes 3 due to scattered light from the integrator lenses 2, 4 simulated in ASAP. Note the y-lobes 21 are much stronger than x-lobes 22 because of the smaller dimension of the lens 11, 14 in this direction.

Figure 4:
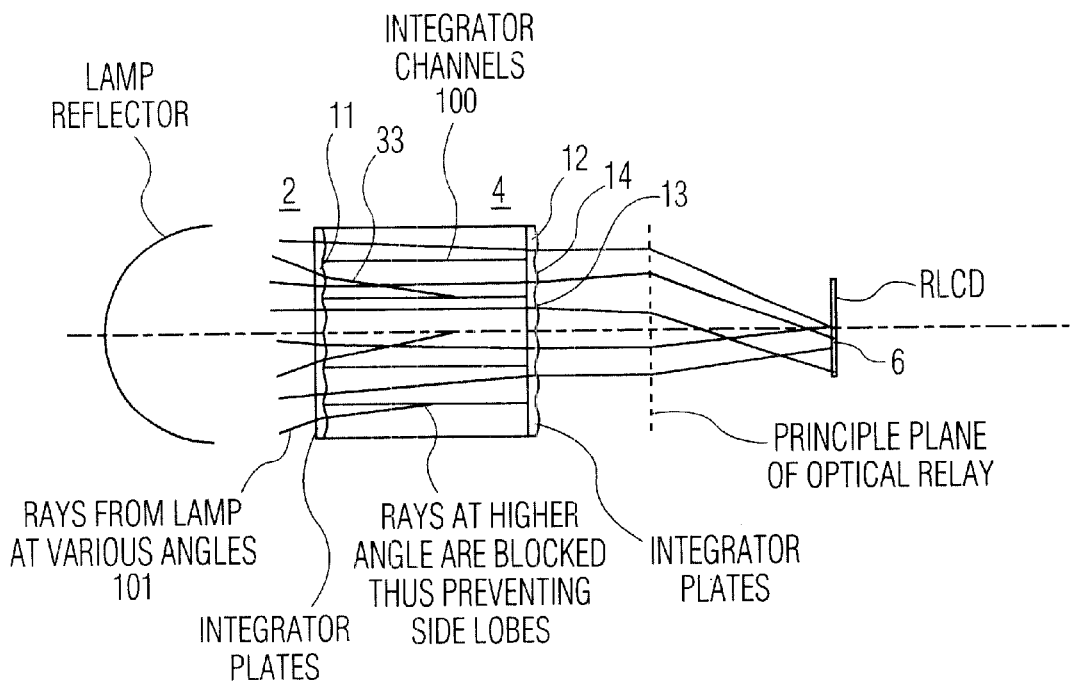
FIG. 4 shows an integrator according to a first embodiment of the present invention having a conduit arrays interposed between the lenslet integrator plates, providing isolated light transmission channels.
Figure 5:
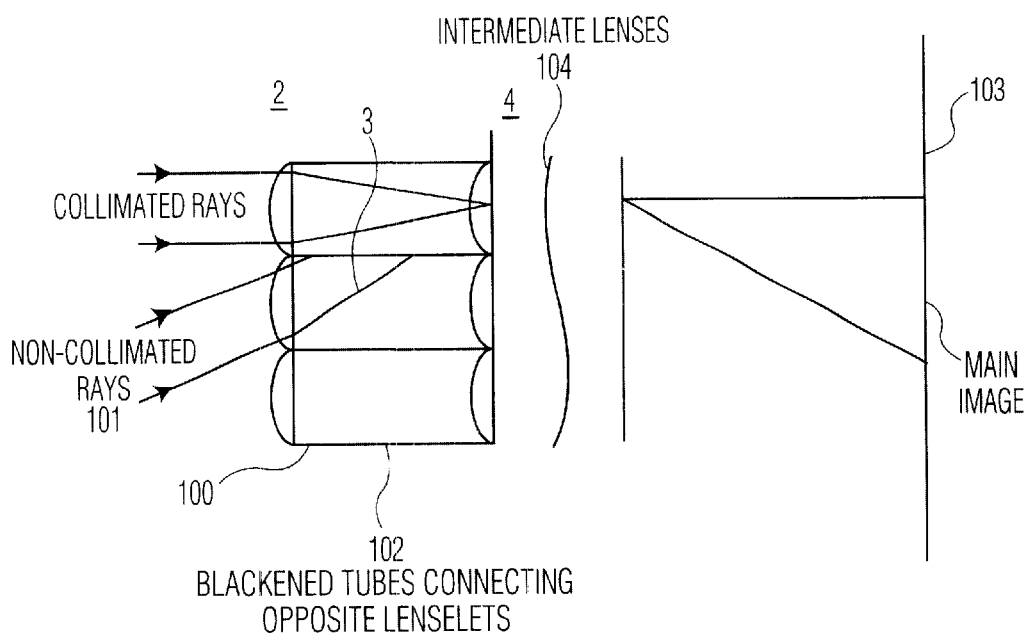
FIG. 5 shows a light path ray tracing through the integrator of FIG. 4, showing interruption of the sidelobe path.
Figure 6:
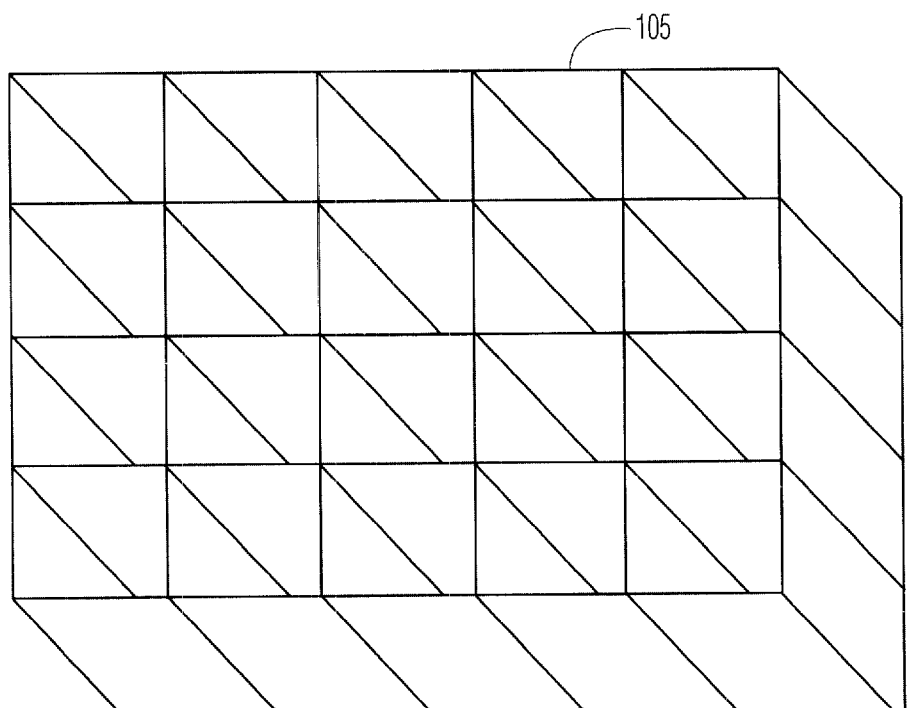
FIG. 6 shows a front perspective view of a conduit array according to the present invention.

According to the present invention, respective pairs of lenslets in the integrator plates 2, 4 are isolated by a conduit 100. Thus, off-axis rays 33, 101 from the first array 2 are interrupted and prevented from reaching other lenslets of the opposed array 4. Therefore, stray light which typically results in loss of contrast is reduced. By placing a tubular structure 102 having conduits 100 between the two integrator plates 2, 4 (as shown in FIGS. 4–6), the cross talk between the lenslets 11, 12, 13, 14 of the two plates 2, 4 is eliminated. Thus, non-collimated rays 33, 101 are obstructed and absorbed by the walls of the conduit 100 array, and prevented from interaction with a non-corresponding integrator lenslet 12, 13. In this way, the aperture from each lenslet 11 of the first integrator array 2 is relayed only to a corresponding lenslet 14 of a second integrator array 4, and imaged at the principal plane 103 of optical relay 104.

FIG. 5 shows in more detail how, as compared to the prior art embodiment shown in FIG. 2, the off axis 101 rays are eliminated, resulting in less stray light.

FIG. 6 shows in more detail a perspective view of the conduit 100 array. This conduit 100 array is rectangular, and typically has dimensions and proportions governed by the function and size of the system. For example, in a liquid crystal on silicon projection system having an aspect ratio of 4:3, the lenslet arrays 2, 4 are, for example, provided as a 5×4 array of plano-convex lenslets, each having a 4:3 ratio. The conduit 100 array is spaced equally with the size of each pair of lenslets 11, 14, and having the same 4:3 aspect ratio. The conduit 100 array is placed between the respective array plates 2, 4, and preferably has apertures 105 near each distal edge to allow air circulation. In order to prevent light leakage, a baffle structure (not shown) may be provided.

Further, the walls of each conduit 100 are preferably non-reflective and absorptive, resulting in attenuation of off-axis 101 light within an integrator cell 11, 100, 14. Off-axis 101 light emitted from the exit lenslet 14 will also result in stray light and loss of contrast.

The walls of the conduit 100 array are preferably heat-conductive, allowing heat dissipation at the periphery of the array. Thus, an electronic black rough finish may be provided on aluminum or copper sheet, formed into the rectangular array.

EXAMPLE 2

Figure 7:
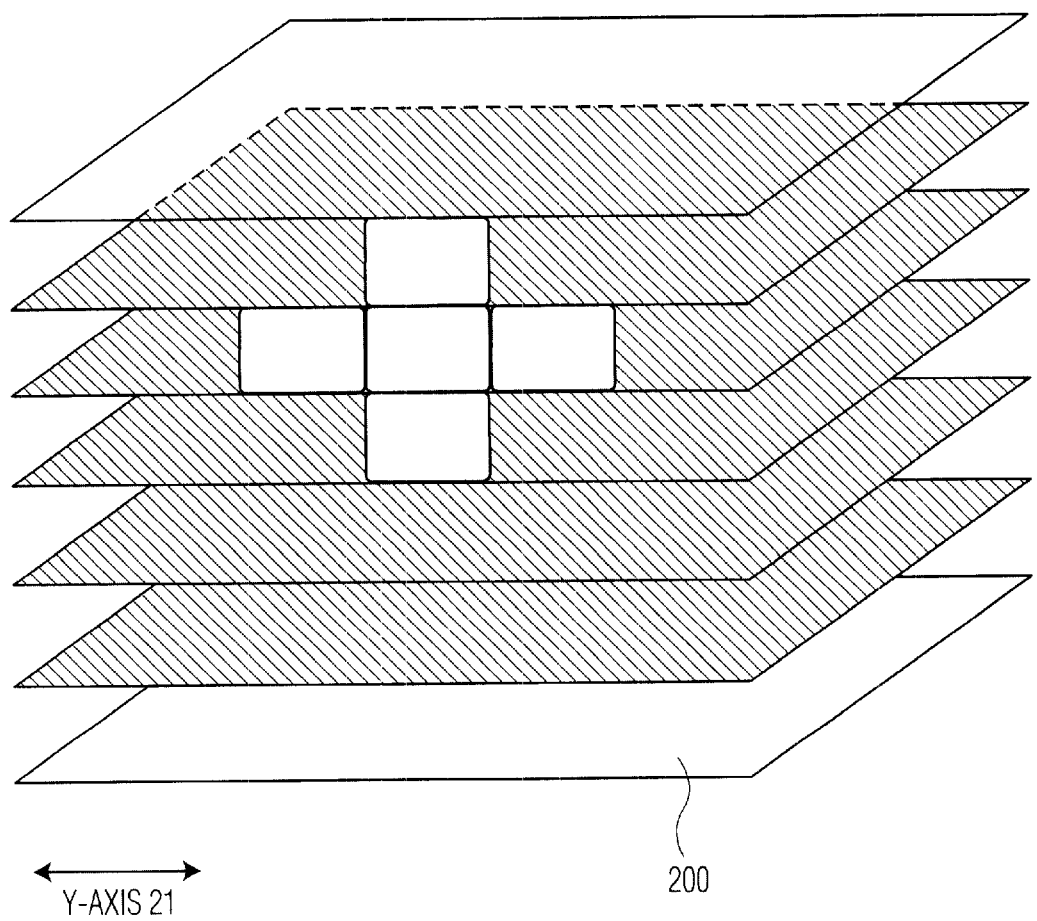
FIG. 7 shows an integrator according to a second embodiment of the present invention having an array of sheets interposed between rows of lenslets of the integrator plates, providing unaxially isolated light transmission channels.

FIG. 7 shows an embodiment of the invention in which thin flat plates 200 separating the rows of lenslets in the smaller (vertical) dimension are provided. For brevity, only four lenslets of an integrator array are shown. It is understood, however, that the integrator plates comprise a complete array of lenslets, for example a 5×5 asymmetric array.

As noted above, the intensity of the sidelobes 3 is much stronger in the smaller dimension side of the lenslets. For example, see FIG. 3, where the side lobes are clearly seen to be much stronger along the Y-axis 21 compared with the X-axis 22. Therefore, according to this embodiment, thin flat plates 200 are employed, in place of the conduit 100 employed in Example 1, such that the adjacent lenslets 12, 13, 14 are separated optically only in the smaller directions of the lenslets (i.e. in the Y-axis 21 direction shown in FIG. 3). These parallel plates 200 are coated with a non-reflecting dark coating, so that any rays incident upon them will be absorbed. FIG. 7 shows schematically a front perspective view of this array of flat plates 200. For example, the plates 200 may be formed of a black anodized aluminum sheet with a relatively rough, non-reflective surface.

This embodiment has two advantages compared with a conduit 100 structure in the case of a lenslet 11, 12, 13, 14 that has one side much smaller than the other side. First, it is much simpler design to construct in practice and, secondly, because of larger open spaces, it is much easier to circulate air within this structure for the purpose of cooling.

The present invention also encompasses variations and modifications understood by those skilled in the art. For example, other configurations of lenses, in particular for alternate applications, such as a hexagonal tile array, may be employed, and in such cases, the conduit may, for example, be a round or oval tube. The scope of the present application is thus limited only by the claims appended hereto.

What is claimed is:

1. An optical illumination apparatus, comprising:
   (a) an illumination source;
   (b) a first array of lenslets disposed along an illumination path of said illumination source;
   (c) a conduit array, having a plurality of apertures corresponding to a plurality of said lenslets of said first array of lenslets, said conduit array having non-reflective optically absorptive walls;
   (d) a second array of lenslets, aligned with said conduit array such that rays passing through a respective one of said first array of lenslets and not intercepting said non-reflective optically absorptive walls intersect a respective one of said second array of lenslets; and
   (e) a relay optical structure for integrating light emitted from said second array of lenslets on a focal plane, wherein said conduit array is adapted to dissipate heat from absorbed illumination.

2. The apparatus according to claim 1, wherein said illumination source comprises a lamp having a paraboloid reflector.

3. The apparatus according to claim 1, wherein said first array of lenslets comprises N×M coplanar lenslets having parallel axes, wherein N and M are each greater than 1.

4. The apparatus according to claim 3, wherein N is 4 and M is 5.

5. The apparatus according to claim 3, wherein said conduit array comprises an N×M array of separated apertures.

6. The apparatus according to claim 3, wherein said conduit array comprises an N×1 array of apertures, each aperture corresponding to M lenslets of said first array of lenslets.

7. The apparatus according to claim 3, wherein said second array of lenslets comprises N×M coplanar lenslets having parallel axes aligned with respective lenslets of said first array of lenslets.

8. A method of illuminating, comprising the steps of:
   (a) illuminating a field with an illumination source, having spatial intensity variations over an illumination field;
   (b) receiving light from the illumination field of the illumination source with a first segmented integrator plate, having a plurality of segments, each segment having a lenslet;
   (c) segregating light from each respective lenslet with an elongated baffle, having a plurality of apertures corresponding to a plurality of respective lenslets, and an optically absorptive non-reflective wall between adjacent apertures;
   (d) receiving light from a respective lenslet of the first segmented integrator plate passing through a respective aperture with a second segmented integrator plate, each segment of said second integrator plate having a lenslet;
   (e) relaying the light emitted from the second integrator plate through an optical structure to a focal plane; and
   (f) convectively cooling the elongated baffle;
   whereby light rays impinging on the walls of the elongated baffle are not transmitted through the aperture, substantially attenuating light rays having acute angles, and the illumination at the focal plane is substantially uniform.

9. The method according to claim 8, wherein the illumination source comprises a lamp having a paraboloid reflector.

10. The method according to claim 8, wherein the first segmented integrator plate comprises N×M coplanar lenslets having parallel axes, wherein N and M are each greater than 1.

11. The method according to claim 10, wherein the elongated baffle comprises an N×M array of separated apertures.

12. The method according to claim 10, wherein the elongated baffle comprises an N×1 array of apertures, each aperture corresponding to M lenslets of the first segmented integrator plate.

13. The method according to claim 10, wherein the second segmented integrator plate comprises N×M coplanar lenslets having parallel axes aligned with respective lenslets of the first segmented integrator plate.

14. A method for providing a uniform field of illumination, comprising the steps of:
   (a) receiving light from a lamp having divergent rays and spatial variations in intensity;
   (b) passing light from the lamp through a first segmented integrator plate, having a plurality of segments, each segment having a lenslet having an axis, light from a respective lenslet of the first segmented integrator plate being relayed along the axis to a respective lenslet of a second segmented integrator plate, wherein a portion of light from the lamp is incident on the lenslets of the first segmented integrator plate so as to be refracted toward a non-corresponding lenslet of the second segmented integrator plate;
   (c) disposing a light-absorptive non-reflective baffle to isolate respective corresponding lenslets of the first and second segmented integrator plates to absorb light refracted by a lenslet of the first segmented integrator plate toward a non-corresponding lenslet of the second segmented integrator plate;
   (d) relaying the light transmitted from the second integrator plate through an optical structure to a common focal plane; and
   (e) convectively cooling the elongated baffle.

15. The method according to claim 14, wherein the first segmented integrator plate comprises N×M coplanar lenslets having parallel axes, wherein N and M are each greater than 1.

16. The method according to claim 15, wherein the baffle comprises an N×M array of separated apertures.

17. The method according to claim 15, wherein adjacent rows of N lenslets are separated from each other by a common baffle.

18. An optical illumination apparatus comprising:
   an illumination source;
   a first array of lenslets disposed along an illumination path of said illumination source;
   a conduit array having a plurality of apertures corresponding to a plurality of said lenslets of said first array of lenslets, said conduit array having non-reflective optically absorptive walls; and
   a second array of lenslets, aligned with said conduit array such that rays passing through a respective one of said first array of lenslets and not intercepting said non-reflective optically absorptive walls intersect a respective one of said second array of lenslets;
   wherein said conduit array is adapted to dissipate heat from absorbed illumination.

19. A method of illuminating comprising:

passing light through a first set of lenslets, a baffle having light-absorptive non-reflective walls, and a second set of lenslets;

substantially attenuating light incident on said walls; and convectively cooling the baffle.

* * * * *